(12) United States Patent
Andrade et al.

(10) Patent No.: US 8,589,864 B2
(45) Date of Patent: Nov. 19, 2013

(54) AUTOMATING THE CREATION OF AN APPLICATION PROVISIONING MODEL

(75) Inventors: Henrique Andrade, Croton-on-Hudson, NY (US); Judah M. Diament, Bergenfield, NJ (US); Andrew L. Frenkiel, Irvington, NY (US); Bugra Gedik, White Plains, NY (US); Martin J. Hirzel, Yorktown Heights, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 12/693,675

(22) Filed: Jan. 26, 2010

(65) Prior Publication Data

US 2011/0185339 A1    Jul. 28, 2011

(51) Int. Cl.
*G06F 9/44*    (2006.01)
*G06F 9/445*    (2006.01)

(52) U.S. Cl.
USPC .......................... 717/104; 717/174; 717/175

(58) Field of Classification Search
USPC ........................................................ 717/104
See application file for complete search history.

(56) References Cited

U.S. PATENT DOCUMENTS

| | | | |
|---|---|---|---|
| 7,171,659 B2 | 1/2007 | Becker et al. | |
| 7,409,463 B2 | 8/2008 | Ramachandran | |
| 7,458,073 B1 * | 11/2008 | Darling et al. | 717/168 |
| 2005/0049906 A1 * | 3/2005 | Leymann et al. | 705/8 |
| 2007/0169103 A1 * | 7/2007 | Bhatkhande et al. | 717/170 |
| 2008/0201705 A1 * | 8/2008 | Wookey | 717/175 |
| 2009/0007091 A1 | 1/2009 | Appiah et al. | |
| 2010/0042974 A1 * | 2/2010 | Gutz et al. | 717/121 |

OTHER PUBLICATIONS

"SPADE: The System S Declarative Stream Processing Engine," Gedik et al., SIGMOD '08, Jun. 9-12, 2008, pp. 1123-1134.

* cited by examiner

*Primary Examiner* — Li B Zhen
*Assistant Examiner* — Arshia S Kia
(74) *Attorney, Agent, or Firm* — William Stock, Esq.; Blanche E. Schiller, Esq.; Heslin Rothenberg Farley & Mesiti P.C.

(57) ABSTRACT

An application provisioning model is automatically created. The model is created from a high-level application and specifies dependencies of the application. It is used to provision the application on one or more nodes or other actions.

22 Claims, 9 Drawing Sheets

AUTOMATING THE CREATION OF AN APPLICATION PROVISIONING MODEL

This invention was made with Government support under Contract No. H98230-07-C-0383, awarded by Intelligence Agencies. The Government has certain rights in this invention.

BACKGROUND

This invention relates, in general, to application provisioning, and in particular, to facilitating creation of application provisioning models used to provision applications.

Application provisioning is the process of retrieving assets (e.g., components) of an application from a staging location (e.g., a developer's workspace or an application asset provisioning repository) and placing them in a location where the application can be executed (i.e., one or more computing nodes).

Currently, provisioning systems presume the existence of an application provisioning model to be used for software provisioning workflows. The systems use a model of the application and other dependent assets to prepare for an action concerning the application (e.g., to provision it, to run it, to uninstall it and its dependencies, etc.). The model and other dependent assets describe the application in terms of its software components (e.g., data and binary files, source code, etc.) and the actions to be performed on the computing nodes.

The application provisioning models that are currently used by the provisioning systems are created manually. A user specifically indicates which dependencies are to be included in a model.

BRIEF SUMMARY

The manual creation of an application provisioning model capturing all the dependencies of an application, in particular, large multi-asset applications, can become a complex and error-prone task. The lack of an automation framework can lead to errors with missing dependencies whose detection might be delayed to runtime, when users or an automated job management system try to actually deploy the application in the production environment.

In simple cases, this complexity might imply a delay in being able to start an application due to failures in placing all relevant assets needed by an application when attempting to launch it. On the other hand, in mission critical environments, for example, reactive systems processing time-sensitive data, such as infrastructure monitoring systems, financial engineering applications, among others, delays due to failures related to incomplete provisioning might be unacceptable.

In accordance with an aspect of the present invention, a framework is described for automating the creation and maintenance of an application provisioning model. In one example, a code generation approach is employed that enables a compiler to analyze a multi-asset-based application description provided in a high-level programming language, extract all relevant dependencies necessary to the application, and automatically create an environment-independent application provisioning model directly usable by a provisioning system.

The shortcomings of the prior art are overcome and additional advantages are provided through the provision of a method of determining application dependencies. The method includes, for instance, automatically determining, by a first processor, one or more first-level dependencies of an application; automatically recursively identifying, by a second processor, based on the one or more first-level dependencies, at least one other dependency of the application at one or more other levels of dependency; and provisioning the application based on a fully resolved application provisioning model produced based on the one or more first-level dependencies and the at least one other dependency.

Systems and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
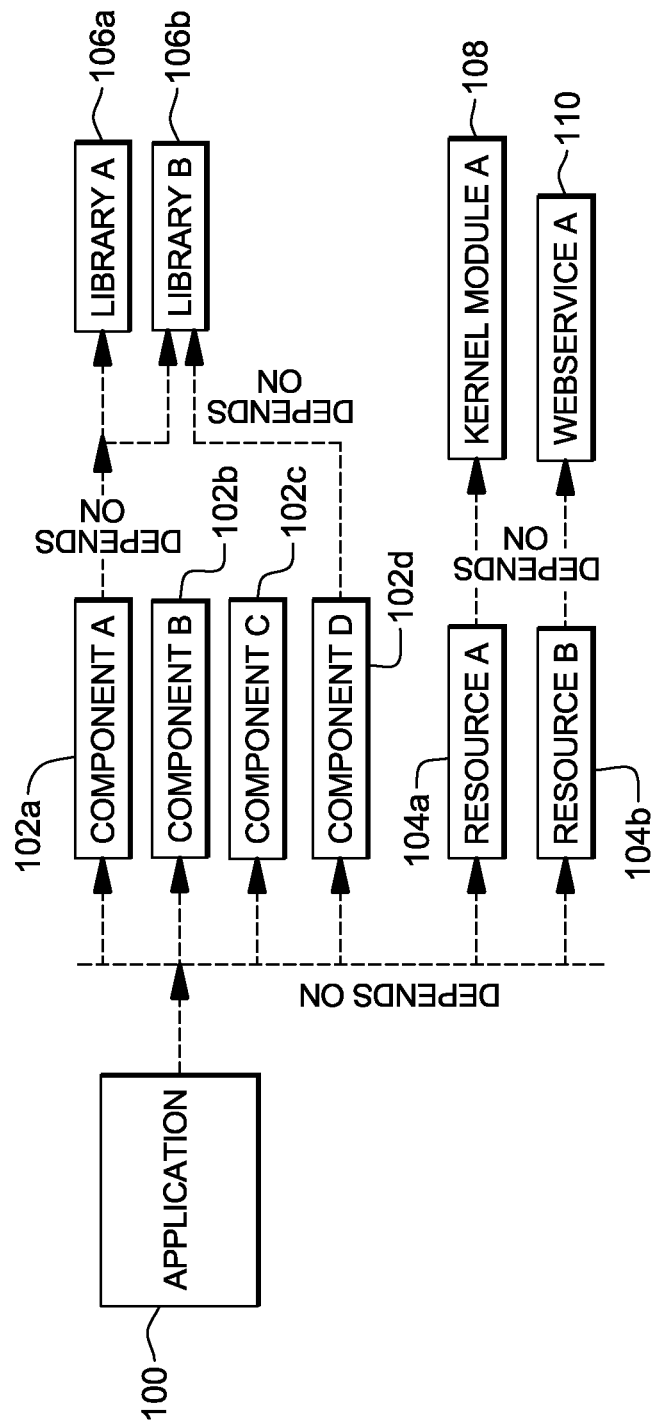
FIG. 1 depicts one embodiment of an application with its first-level dependencies and their dependencies, in accordance with an aspect of the present invention.

In accordance with an aspect of the present invention, a capability is provided for automatically creating an application provisioning model to be used in provisioning an application. The application provisioning model specifies the dependencies of an application. It can be a particular structure or it can be a logical entity used to collectively refer to the dependencies of an application. In one example, the application provisioning model includes first-level dependencies of an application (i.e., those explicitly specified in the application), as well as dependencies on the first-level dependencies (i.e., second-level dependencies), and so forth (i.e., nth-level dependencies). For instance, if App A depends on Component A, which depends on Component Z, which depends on Library X, then Component A is a first-level dependency, Component Z is a second-level dependency, and Library X is a third-level dependency, and so forth. All of these dependencies are collectively referred to as an application provisioning model for the application (regardless if a particular structure encapsulating these dependencies is created).

In one particular example, the application provisioning model is created from an application model specifying first-level dependencies of the application, and asset models describing dependencies of the assets of an application, including the first-level dependencies. There is, for instance, an asset model for each asset (e.g., component, resource, etc.) of the application, and each asset model describes the dependencies of its asset. The application provisioning model is provided to, for instance, an application provisioning system to provision the application.

The application to be modeled and provisioned is, for example, a multi-asset application and a framework is provided in which a high-level description of the application employs a mechanism that captures direct dependencies between an asset and other software or hardware assets of the application. The mechanism includes, for instance, (a) a high-level asset-based description of the application; each asset lists its individual dependencies (asset models) and a system is defined to capture these dependencies; (b) a compiler that analyzes the high-level description of the application and produces an application model in terms of the components and other assets the application depends on; and (c) a technique to customize the application provisioning model (e.g., the dependencies of the application) at the time of application deployment.

An exemplary list of dependencies includes, but is not limited to, a component dependency on an external library; a component dependency on an external state sharing service; a component dependency on an external web service; a component dependency on bootstrapping data; a component or external library dependency on the existence of a particular configuration relating to hardware (e.g., a device driver); an external library dependency on other libraries; a multi-component application dependency on a certain toolkit of components; etc.

In one example, a structured model-based representation is employed where an individual asset can be created and represent dependencies it has on external libraries, bootstrapping data, or external services, as examples. For instance, as shown in FIG. 1, an application 100 depends on a plurality of components 102a-102d and a plurality of resources 104a-104b (referred to herein as first-level dependencies). In this particular example, Component A depends on Library A 106a and Library B 106b (referred to herein as second-level dependencies); and Component D depends on Library B 106b. Similarly, Resource A depends on Kernel Module A 108 (second-level dependency) and Resource B depends on Webservice A 110 (second-level dependency). All of these assets, as well as the assets the second-level dependencies and other level dependencies depend on, are to be present for the application to successfully run.

Figure 2A:
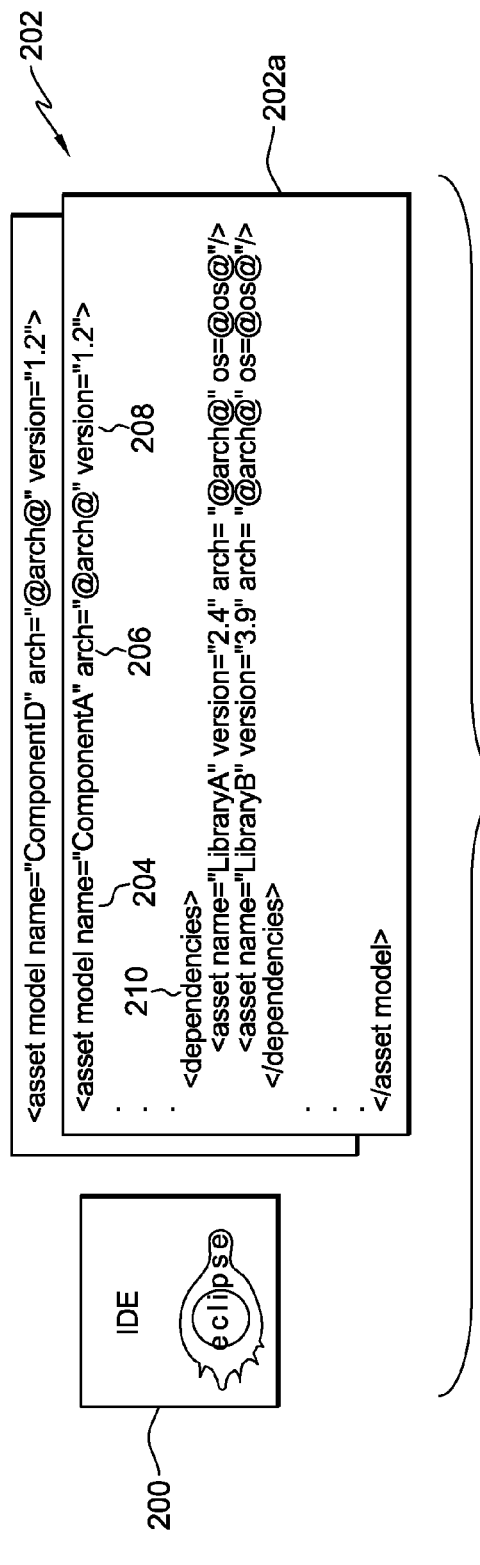
FIG. 2A depicts one example of using an integrated development environment (IDE) to create one or more asset models to be used in provisioning an application, in accordance with an aspect of the present invention.
Figure 2B:
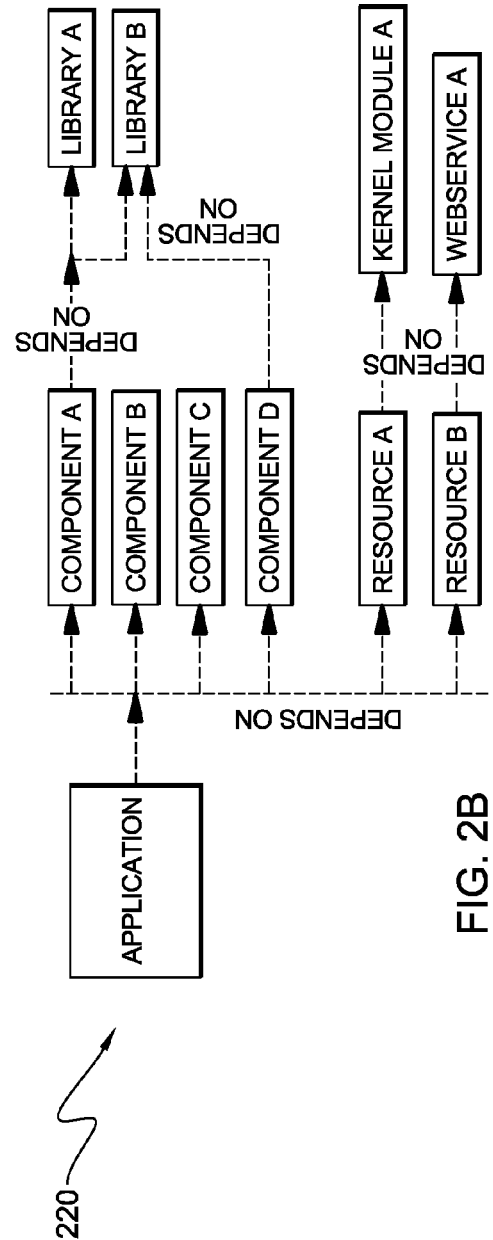
FIG. 2B depicts one example of a graph composed based on the asset models of FIG. 2A, in accordance with an aspect of the present invention.

To build an asset-based application from which an application provisioning model is automatically created, in one example, an integrated development environment (IDE) is used, as depicted in FIG. 2A. As one example, an integrated development environment 200 runs on a development platform, such as Eclipse, and includes a high-level programming language (e.g., Stream Processing Language, formerly known as SPADE) employed to write an asset-based application. (SPADE or Stream Processing Language, offered by International Business Machines Corporation, is described in "SPADE: The System S Declarative Stream Processing Engine," Gedik et al., SIGMOD '08, Jun. 9-12, 2008, pp. 1123-1134.) From the application, pieces are extracted that represent the dependencies between the various assets of the application. For example, an asset model 202 is created for each asset of the application. It describes the one or more dependencies that asset has on other assets. As an example, asset model 202a represents Component A and indicates that Component A has a dependency on Library A and Library B. If, in another embodiment, Library A or Library B had a dependency on an asset, then the asset model for that library would specify the dependency, which would be a third-level dependency, and so forth. The asset models are used to produce graph 220, which is a structural representation of the asset models for a particular application.

Many assets may be used by an application. As examples, an asset is a building block of an application or an application, itself. An asset can be of many different types, including, for instance:

1) A component, which is a self-contained portion of computation that carries out domain-specific processing. A component can be, for example, a web service that generates a random number or a stream processing operator that computes the aggregation of tuples arriving to within certain time windows;
2) A component toolkit, which is a collection of components that are logically related; for example, considering a data processing domain, such as signal processing or data mining;
3) An application, which is a top-level construct that employs other assets, such as components, libraries, data files, external computational resources, with the aim of processing data and producing results. For example, the services provided by an e-business web store can be delivered by an application. Similarly, a stream processing task, such as inspecting data from the stock exchange with the aim of spotting trading bargains, can be implemented by a stream processing application;
(4) A library, which is a collection of classes and functions providing a set of services to external users. Libraries are implemented using languages, such as Java or C++, and are properly packaged for use in binary form as static or dynamic artifacts that an application can be linked against;
(5) A data file, which is a storage artifact where bootstrapping information for an application can be kept; and
(6) A computational resource, which is loosely defined as an external entity to an application that provides a certain service. For example, a web server, a device driver, or a database server that forms a computational ecosystem with an application.

Other examples are also possible.

In one example, a developer creates an asset model for each asset, i.e., for each component, library, data file, etc. Specifically, for each one of these assets, a structured model is created by the developer employing, for example, a command-line or the GUI-based integrated development environment (IDE). The model for an asset includes the dependencies for that asset being packaged, e.g., for storage in a software provisioning repository.

As examples, when packaging a new component, dependencies relating to, for instance, libraries this new component might depend on, data files with bootstrapping data, or a computational resource this component requires are collected.

When packaging a new library, dependencies relating to, for instance, other libraries and data files this new library might depend on are collected.

When writing a new application, including a collection of components, the application writer includes the appropriate specification of toolkits containing these components; e.g., as is done in the Stream Processing Language. Therefore, in this case, the dependencies are stated in terms of toolkits an application uses, as well as the direct use of operators from these toolkits in the context of the application.

As described with reference to FIG. 2A, an asset model includes metadata that defines certain characteristics of the asset including, but not limited to, a name 204, architectural dependencies 206 (e.g., operating system, platform, etc.), a version 208 of the architectural dependencies, as well as dependencies 210, if any, on other assets. This information can be captured in an XML-file (or other type of representation), and such file becomes the asset model to be used by, for instance, the compiler to create the application provisioning model, or by the software provisioning system at runtime, when recursively fetching the dependencies of an application. Although various attributes of the asset are provided, these are only examples. Additional, less or different attributes can be incorporated and employed without departing from one or more aspects of the present invention.

Figure 3:
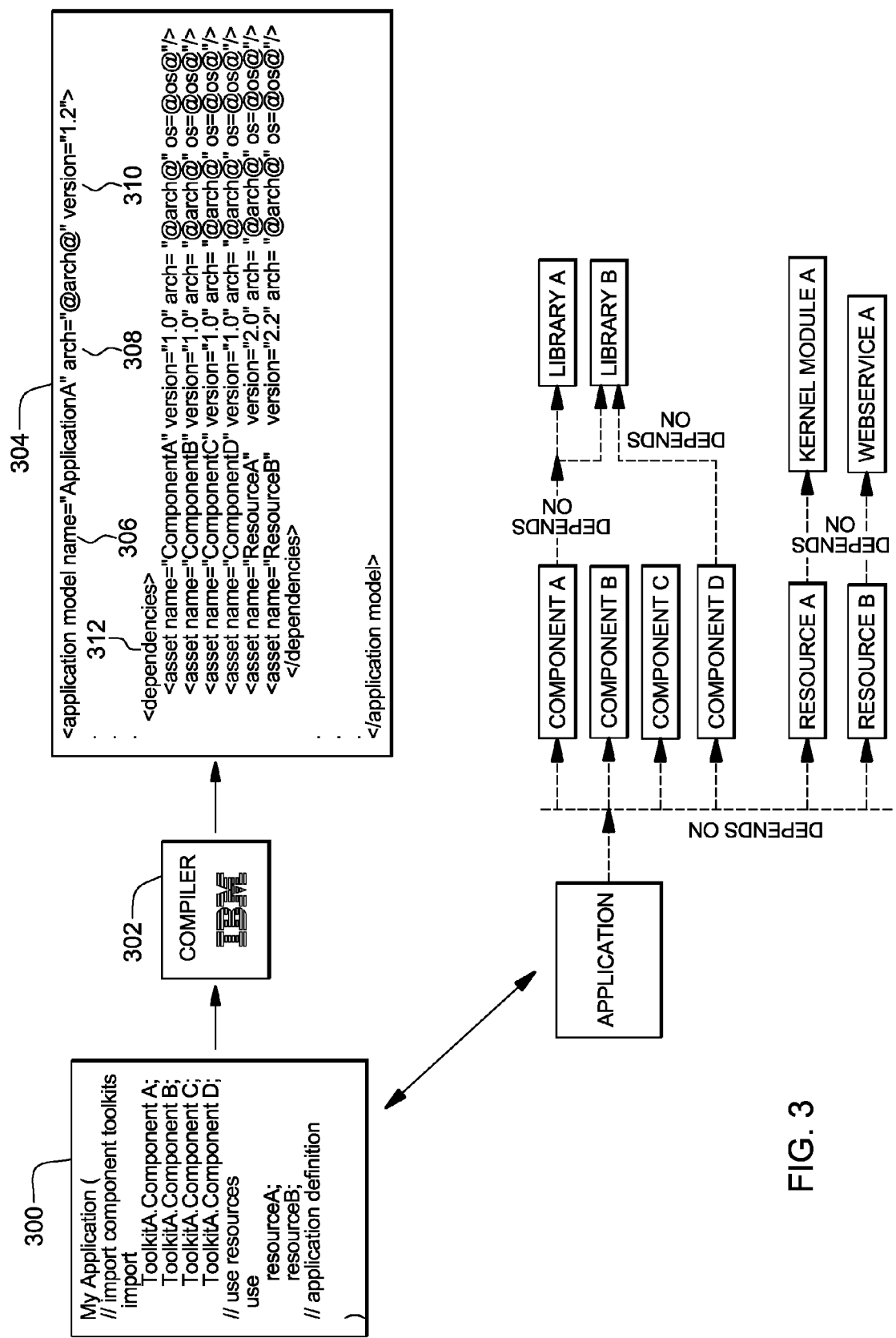
FIG. 3 depicts one embodiment of using a compiler to analyze an application to automatically create an application model, in accordance with an aspect of the present invention.

In addition to the asset models, an application model is created and employed to provide the application provisioning model, as described with reference to FIG. 3. Referring to FIG. 3, an application 300 is input to a compiler 302 (or other preprocessor), which analyzes the application and automatically produces an application model 304. The application model is a top-level model based on dependencies directly expressed by the application (i.e., first-level dependencies). In this particular example, application model 304 includes various metadata, including a name 306, a specified architecture 308, and a version of the architecture 310. It also specifies the first-level dependencies 312 of an application.

In one example, the application model is automatically created by the compiler extracting the direct dependencies from the application source file, as the application declares its direct dependencies on assets, such as toolkits and computational resources. A toolkit allows the creation of a logically related collection of components (e.g., operators). An application can explicitly state a toolkit dependency as shown in FIG. 3, in which ToolkitA has a dependency on Components A, B, C and D. While toolkits are used by the application described herein, they are not required.

Figure 4A:
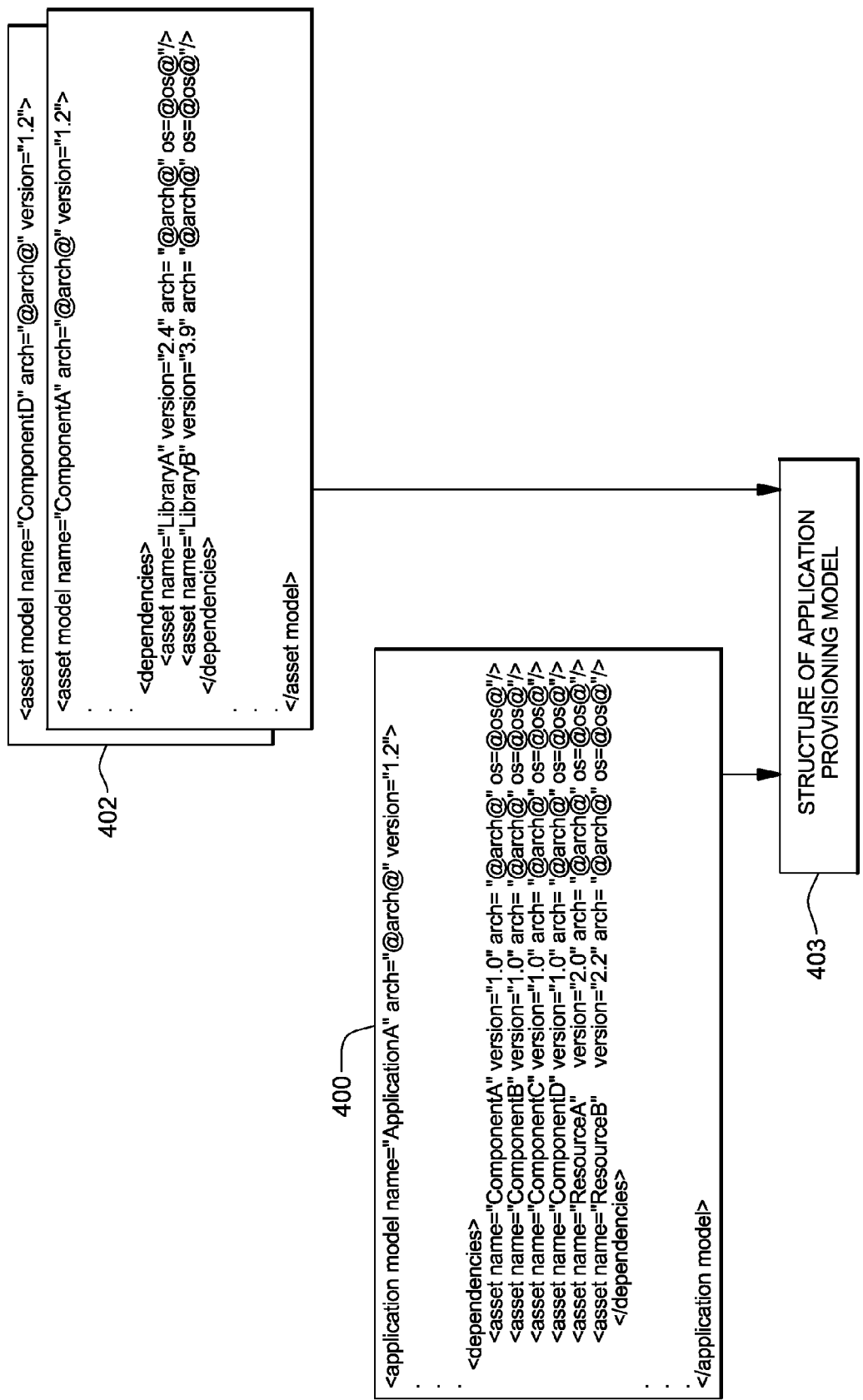
FIG. 4A depicts one example of the inputs to create an application provisioning model, in accordance with an aspect of the present invention.

In one example, the compiler can recursively extract the dependency an application has on a particular toolkit. As the dependencies from the specific operators used by this application are recursively unrolled, a comprehensive list of dependencies is automatically generated by the compiler. As the compiler parses the top-level source code for the application and recursively visits each asset model, it fetches its dependencies, which in turn describes their own dependencies, which are also retrieved. The collection of first-level dependencies from the application model and other dependencies recursively identified from the asset models for the application is referred to as the application provisioning model. In this example, the compiler automatically creates this model, and a structure is built that defines the application provisioning model. For instance, as shown in FIG. 4A, dependencies of application model 400 and dependencies of asset models 402 are used to create an application provisioning model structure 403. In this example, this structure is, for instance, an XML representation of the graph of FIG. 3.

In a further embodiment, however, an actual structure representing the application provisioning model is not created, but instead, the dependencies of the application provisioning model are determined and forwarded to a tool and/or determined by the tool itself (e.g., a software provisioning system) for a specified use. Specifically, in one example, the compiler creates the application model, which is input to the tool, and the tool recursively obtains the other dependencies from the asset models input to the tool. This is described with reference to FIG. 4B.

Figure 4B:
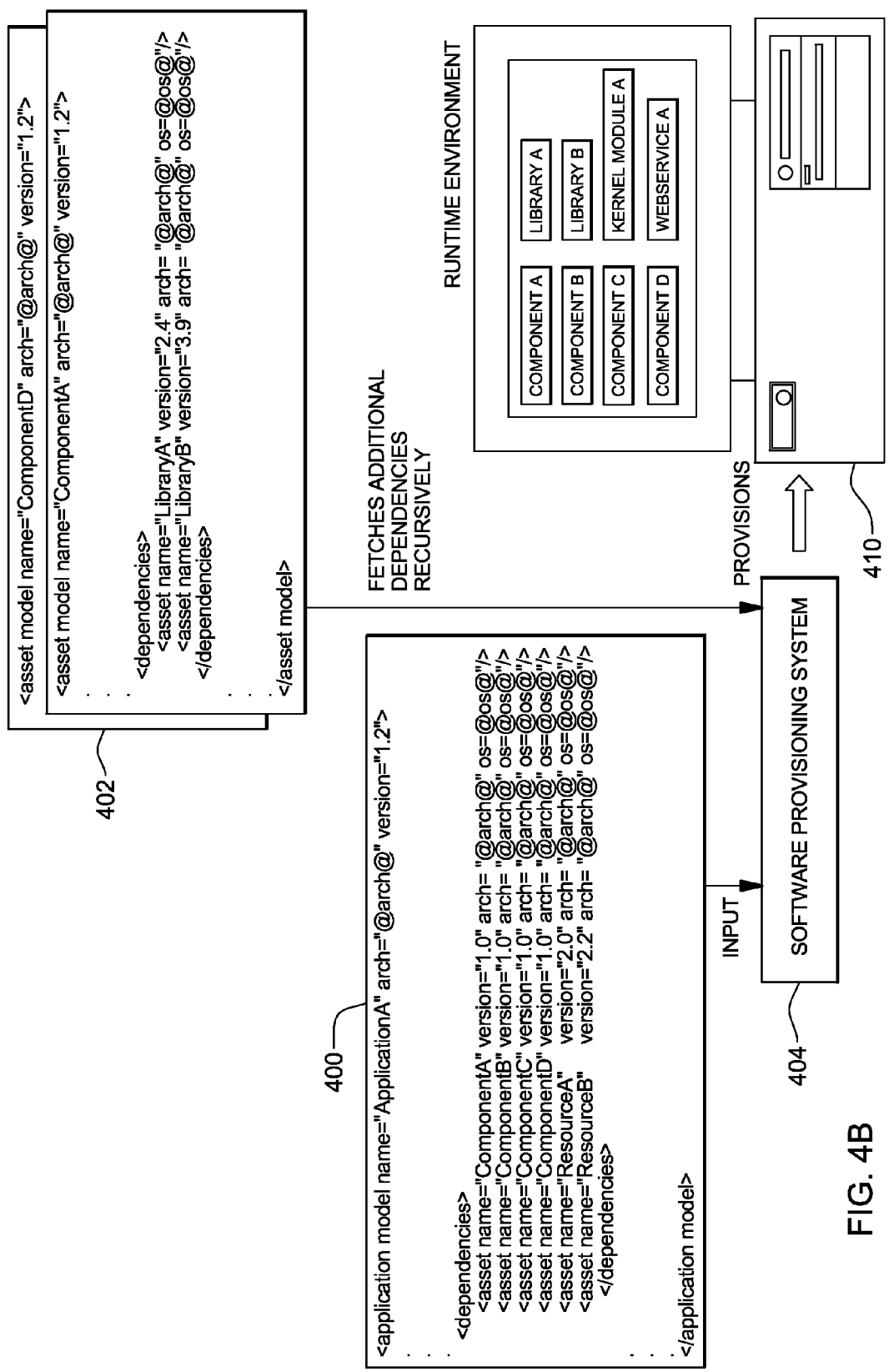
FIG. 4B depicts one embodiment of using a provisioning system to provision the application, in accordance with an aspect of the present invention.

As illustrated in FIG. 4B, an application model 400 and a plurality of asset models 402 are input to a software provisioning system 404. In particular, software provisioning system 404 receives as input application model 400, which includes the first-level dependencies, and recursively fetches the other dependencies of the application from the asset models in order to prepare the runtime environment or return an error, if a problem is detected. Software provisioning system 404 provisions the application based on the dependencies of application model 400 and the dependencies of the appropriate asset models 402 (collectively referred to as the application provisioning model) on a runtime environment 410.

One embodiment of the logic to automatically create an application provisioning model (either as a specific structure or logically) to be used to provision an application is described with reference to FIGS. 5 and 6. In one example, one or more aspects of this invention are described within the context of a distributed runtime infrastructure and programming models that were developed as part of a general purpose data stream processing middleware, referred to as System S or InfoSphere Streams, and the InfoSphere Streams Stream Processing Language, offered by International Business Machines Corporation, Armonk, N.Y. Therefore, aspects of this middleware and programming language are described below. However, one or more aspects of the present invention may be employed in other types of systems and environments.

InfoSphere Streams and Stream Processing Language support structured and unstructured distributed data stream processing applications that can span a large number of computing nodes. Such a distributed nature is one reason for automating the creation of an application provisioning model as a mechanism to support the preparation of the runtime environment by properly and automatically placing the software assets that an application depends on, as well as the application itself, on the compute nodes that will host the application.

The InfoSphere Streams middleware can execute a large number of long-running stream processing applications. Applications can interact as part of a single application or a set of related applications possibly taking the form of complex data-flow graphs. A data-flow graph includes a set of processing elements (e.g., InfoSphere Streams runtime execution units) connected by data streams, in which each data stream carries a series of tuples. The processing elements are containers that host components (e.g., Stream Processing Language operators) that implement data stream analytics and can be distributed on multiple computing nodes. The computing nodes can be organized as a shared-nothing cluster of workstations or as a large supercomputer, as examples. The processing elements communicate with each other via their input and output ports, which are connected by the data streams. The processing element ports, as well as the data streams, are strongly typed, employing an application-defined type system, which is typically built by combining InfoSphere Streams supported basic types that range from numeric types, such as eight-bit integers, to complex types, such as lists of basic type elements.

The Stream Processing Language declarative language is used, in one example, to program these multi-operator applications. The language provides a rapid application development front end that includes a plurality of features. One of these features is a language for flexible composition of parallel and distributed data flow graphs. This language can be used directly by programmers, or can be used between task-specific higher level programming tools (e.g., for querying, composition of map-reduce flows, or the like) and lower-level application programming interfaces (APIs). Another feature of the Stream Processing Language declarative language is extensibility based on support for adding new toolkits of type-generic stream processing operators. Further, the Stream Processing Language declarative language includes a broad range of edge adapters that are used to ingest data from external sources and to publish results to external consumers (e.g., network sockets, databases, file systems, proprietary platforms, and the like).

Stream Processing Language's stream-centric design implies a language where the basic building block is a stream. In other words, an application writer can quickly translate the flows of data from a block diagram (see, e.g., FIG. 1) into the application source code by listing the stream flows and stating which operator (e.g., component) generates a data stream.

Stream Processing Language's operator-based programming is focused on designing the application by reasoning about the smallest possible building blocks necessary to deliver the computation an application is designed to perform. This building block processing logic defined by an operator might make use of other assets, such as libraries and hardware resources, such as a particular physical I/O device. These dependencies are specified once an asset model for the operator is created as part of the process of extending the Stream Processing Language, by adding a new operator to a toolkit, etc. These dependencies are explicitly stated, as depicted in FIG. 2A.

Figure 5:
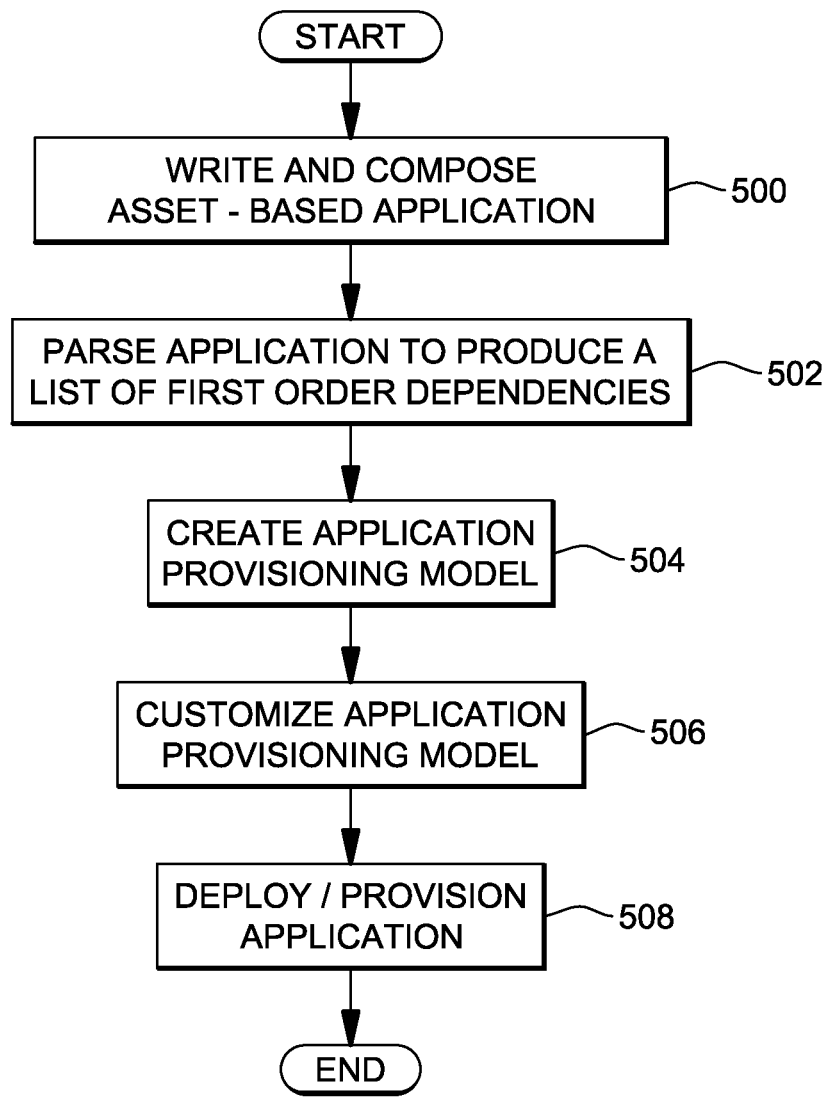
FIG. 5 depicts one embodiment of the logic to automatically create an application provisioning model and to use that model to provision an application, in accordance with an aspect of the present invention.
Figure 6:
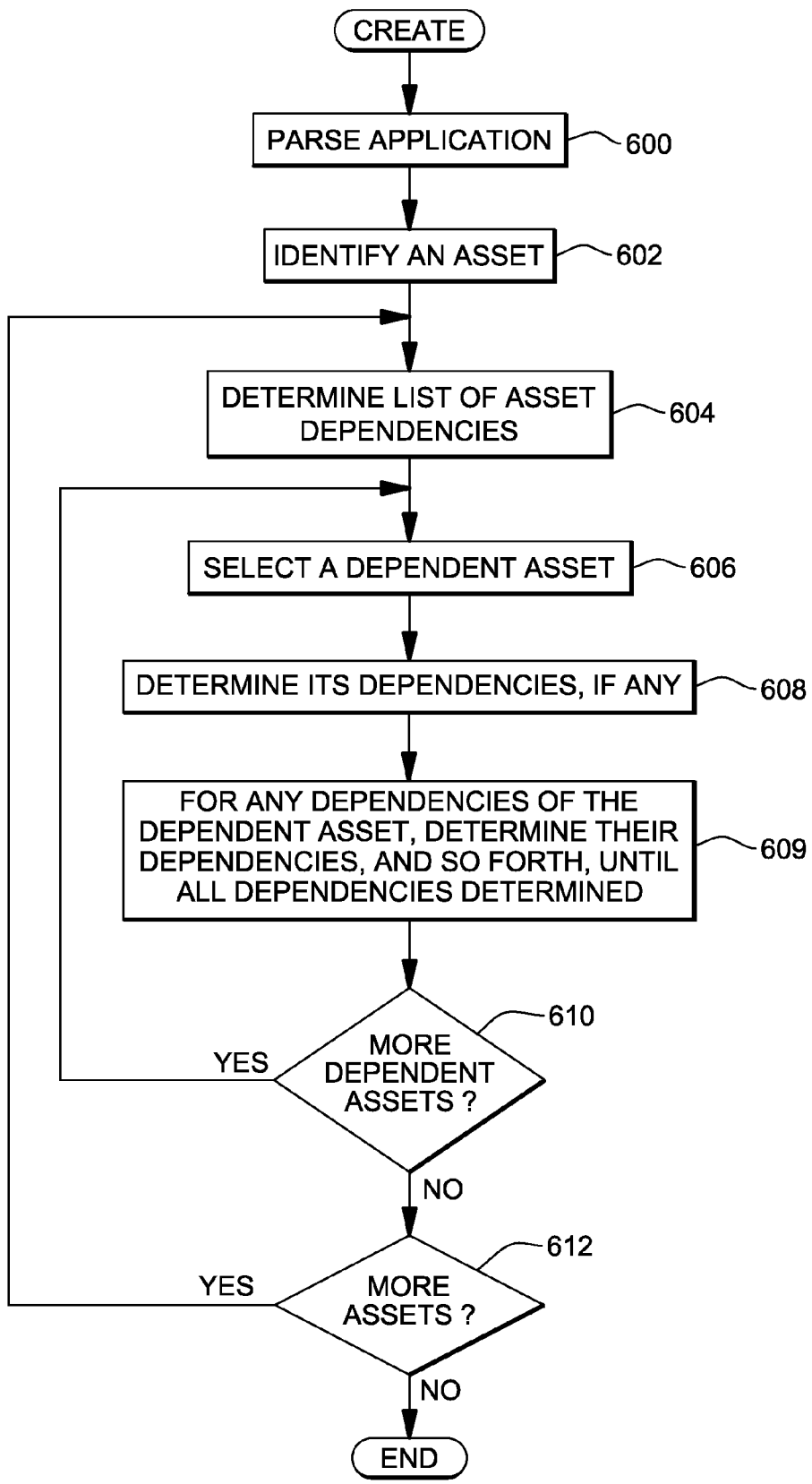
FIG. 6 depicts one embodiment of the details to create the application provisioning model, in accordance with an aspect of the present invention.

Referring to FIG. 5, to create an application provisioning model and to provision an application based on that model, initially, an asset-based application is written and composed, STEP 500. When writing a new application including a collection of assets, the application writer includes the appropriate specification of toolkits containing these assets, for example, as is done in the Stream Processing Language. Therefore, in this case, the dependencies are stated in terms of toolkits an application uses, as well as the direct use of assets from these toolkits in the context of an application.

The compiler begins parsing the application (e.g., Stream Processing Language application), and as it parses the application, it provides a list of first-level dependencies, STEP 502. From the list of first-level dependencies, an application provisioning model is created, STEP 504, as described in further detail below. The application provisioning model describes this information in a general way, such that it is independent of any environmental characteristics associated with the managed server machines, allowing certain late bindings to take place at deployment time.

Thereafter, the application provisioning model is customized, STEP 506. For instance, when customizing an application provisioning model, an application user is performing the final binding of parameters in the application provisioning model, readying it for execution. In particular, it might be the case that certain resource references are to be bound to specific resources. For example, it might be that an application is going to interact with a particular database server, which means that a developer is to specify the specific ODBC (Open Database Connectivity) driver to use, as well as the location of the database server. Likewise, a developer might specify that a particular URI (Uniform Resource Identifier) is to be used to connect this new application to act as an application data source. Such binding includes new dependencies an application will need to have satisfied at runtime. These dependencies are specified in terms of metadata describing the external resources an application should be bound to. In other words, this workflow includes binding specific resources, such as libraries and URIs, in situations where late binding is desired or needed by an application.

Subsequently, an application based on the application provisioning model is provisioned, STEP 508. That is, the application itself and all dependent assets are placed on the set of computing nodes that will host the application. One example of provisioning is described in U.S. Pat. No. 7,171,659 entitled "System and Method for Configurable Software Provisioning," Becker et al., issued Jan. 30, 2007, which is hereby incorporated herein by reference in its entirety.

Further details regarding creating the application provisioning model are described with reference to FIG. 6. This logic is performed, in one example, by the compiler (or other preprocessor). As the compiler parses the application, STEP 600, an asset (e.g., operator) is identified, STEP 602. For that asset, a list of the asset dependencies is determined, STEP 604. In one example, this information is obtained from the asset model created for that asset.

From the list of dependencies for the asset, a dependent asset is selected, STEP 606, and the dependencies of that asset are determined, if any, STEP 608. Again, to determine the dependencies of that asset, in one example, the asset model created for that asset is used. For any dependencies of the dependent asset, their dependencies are determined, and so forth, until all dependencies (at all levels) are determined, STEP 609.

Thereafter, a determination is made as to whether there are more assets in the list of asset dependencies for this asset, INQUIRY 610. If so, then processing continues with STEP 606. If not, then if another asset (e.g., operator) is found as the application is parsed, INQUIRY 612, the logic continues with STEP 604. If there are no more assets in the application, then processing is terminated.

Thus, as described above, as the compiler (e.g., Stream Processing Language compiler) starts parsing a Stream Processing Language application, it fetches the assets (e.g., operator toolkits) of which this application makes use. As the compiler goes over the specific operators used by the application, it employs the asset models for each of the operators to retrieve the list of asset dependencies a particular operator has and their dependencies, recursively. This process repeats for each operator to be instantiated by the application, as well as all of their dependencies, recursively, resulting in the creation of a collection of all dependencies of an application.

In one example, this collection of dependencies is then encapsulated in a structured file, referred to herein as the application provisioning model (see, e.g., FIG. 4A). In another embodiment, however, the application provisioning model is not encapsulated (see, e.g., FIG. 4B). Instead, the compiler creates the application model (e.g., STEPs 600-604), which is input to the software provisioning system or other system; and the software provisioning system or other system performs STEPS 606-612 to recursively define the other dependencies.

Figure 7:
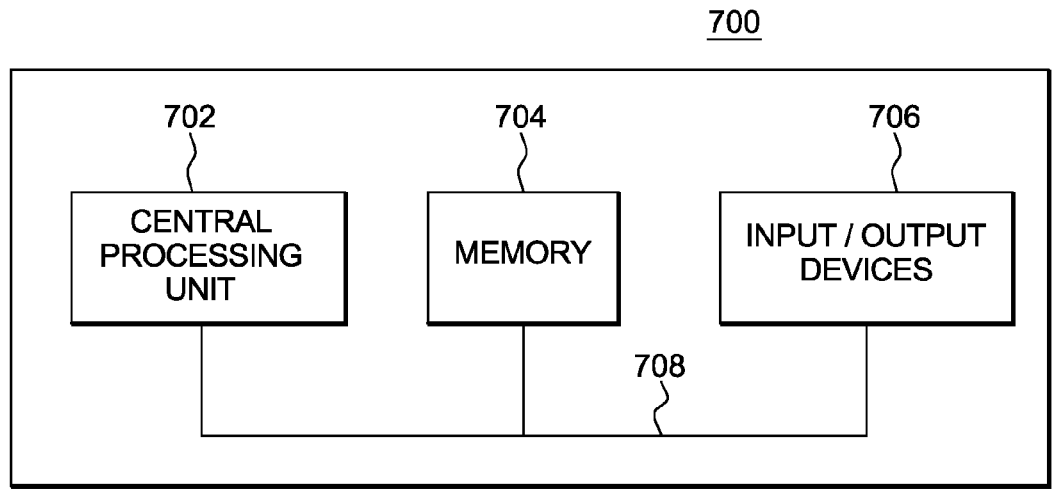
FIG. 7 depicts one embodiment of components of a computing node used in accordance with an aspect of the present invention.

In one example, the compiler employed to produce an application provisioning model executes on a computing node, such as the one depicted in FIG. 7. As shown, computing node 700 includes, for instance, one or more central processing units 702, a memory 704, and one or more input/output devices 706 coupled to one another via one or more buses 708. Computing node 700 is, for instance, a System p®, System x® or System z® server offered by International Business Machines Corporation, and may have an operating system, such as z/OS®, offered by International Business Machines Corporation, or other operating system executing thereon. System p®, System x®, System z®, and z/OS® are registered trademarks of International Business Machines Corporation, Armonk, N.Y. Other names used herein may be registered trademarks, trademarks or product names of International Business Machines Corporation or other companies.

Figure 8:
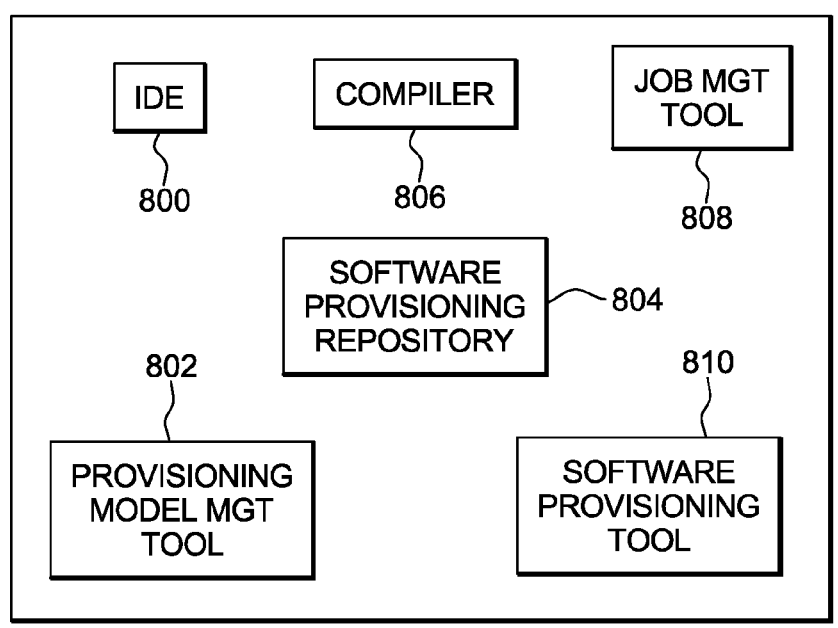
FIG. 8 depicts one embodiment of various tools used to facilitate automatic creation of an application provisioning model, in accordance with an aspect of the present invention.

The compiler is only one tool used to create the application provisioning model. Other tools that may be used are described above and further with reference to FIG. 8. These tools may run on one or more computing nodes. In one example, the tools include the following:

1. An integrated development environment (IDE) 800: This tool is a GUI-based integrated tool that can be used to write and compose asset-based applications. This same tool can include the capability for capturing dependencies between a particular asset and its specific dependencies as part of an operator toolkit building infrastructure;
2. A provisioning model management tool 802: This tool is used for packaging and managing (e.g., add, remove, update) assets that are stored in a software provisioning repository;
3. Software provisioning repository 804: This is where all assets are stored prior to deploying them as part of an application launching operation;
4. An application compiler 806: The compiler is used to create the binaries corresponding to the multi-asset application. It is also used to parse an application to identify the software assets the application is using and to produce a list of the first-level dependencies an application has, creating among other things the application model (it may also create the application provisioning model);
5. A job management tool 808: The job management tool is used to deploy an application onto the distributed runtime environment. Optionally, the job management tool can further customize the application provisioning model at the time an application is slated for execution, binding certain resource requirements to a specific resource, producing a fully resolved application provisioning model. For instance, as depicted in FIG. 4B, certain parameters in the application provisioning model are specified using the notation@parameter@, indicating that they can be customized based on the specifics of the runtime environment where the application is being deployed; and
6. A software provisioning tool 810: This tool is used to carry out the actual provisioning task based on the complete set of dependencies as indicated by the application provisioning model, which retrieves the dependencies from the software provisioning repository and places them on the runtime environment which might include multiple computing nodes.

In other embodiments, more, fewer and/or different tools may be used. These are only examples.

Described in detail above is a capability for automatically creating an application provisioning model to be used to provision an application. A high-level asset-based description of an application is employed, in which each asset of the application lists its individual dependencies. A compiler, or other preprocessing logic, analyzes the high-level description of the application and produces an application model. This model, along with asset models for direct and other dependencies of the application, produce an application provisioning model. This model is then customized at application deployment. This eliminates error prone and tedious tasks associated with compiling the dependency information for large-scale, distributed, asset-based applications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 9:
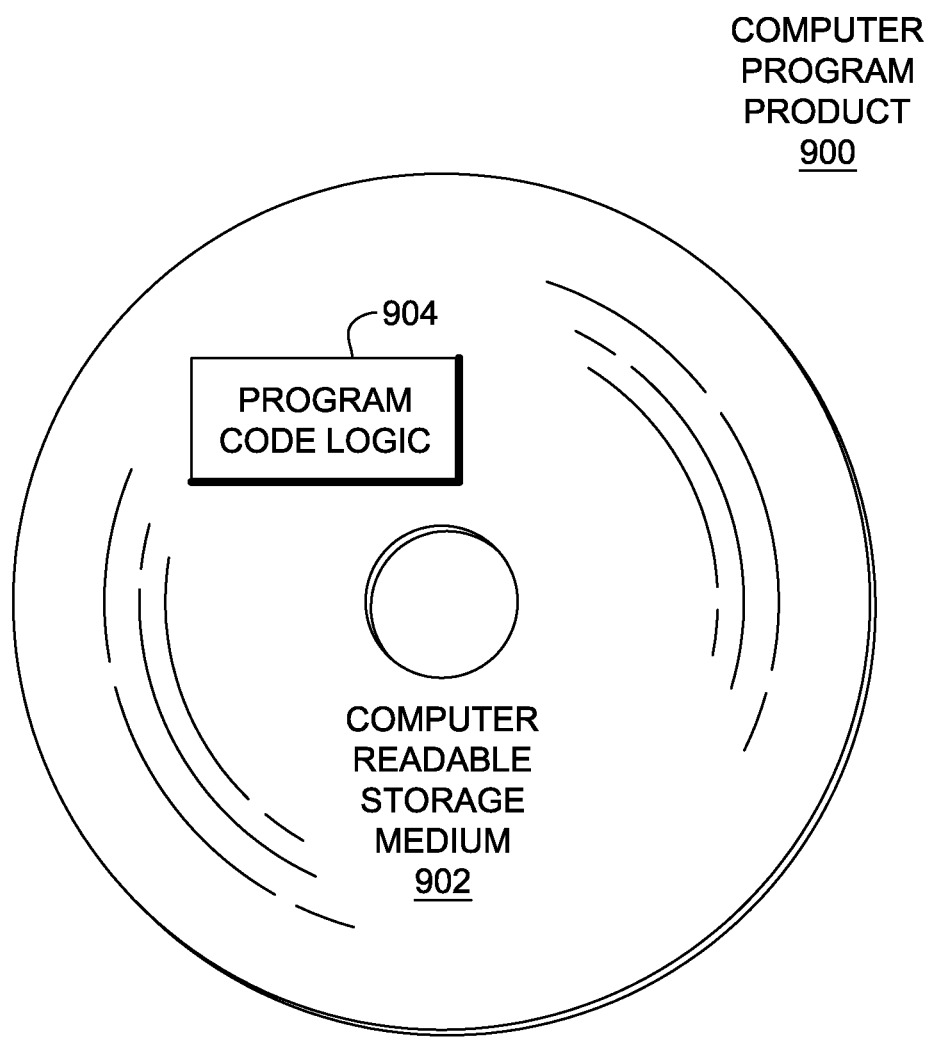
FIG. 9 depicts one embodiment of a computer program product incorporating one or more aspects of the present invention.

Referring now to FIG. 9, in one example, a computer program product 900 includes, for instance, one or more computer readable storage media 902 to store computer readable program code means or logic 904 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, other platforms and/or languages can be used without departing from the spirit of the present invention. Aspects of the invention may be performed by tools other than those described herein. Further, other types of dependencies may be included, and/or many levels of dependencies may be represented. Although provisioning is described herein, the provisioning model may be used for actions other than provisioning. Moreover, for certain steps or logic performed by a compiler, other preprocessors or preprocessing logic can be used. Therefore, the term "preprocessor" includes a compiler, any other preprocessor or preprocessor logic, and/or any type of logic that performs similar functions.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of determining application dependencies, said method comprising:
    automatically creating an application provisioning model to be used in provisioning an application. said automatically creating the application provisioning model comprising:
        automatically determining, by a first processor, one or more first-level dependencies of the application to be provisioned; and
        automatically recursively creating, by a second processor, based on the one or more first-level dependencies, an indication of at least one other dependency of the application at one or more other levels of dependency, wherein the one or more first-level dependencies and the at least one other dependency at one or more other levels of dependency form the application provisioning model, the application provisioning model being fully resolved, and wherein the automatically recursively creating comprises:
            selecting a first-level dependency of the one or more first-level dependencies;
            using an asset description of the selected first-level dependency to automatically determine for that selected first-level dependency one or more second-level asset dependencies, if any; and
            for each determined second-level asset dependency, determining its dependencies, if any, wherein based on determining a dependency for a determined second-level asset dependency, that dependency would be at a different level than the first-level or second-level dependencies, and repeating for the dependency at the different level, if any, the determining its dependencies; and
    provisioning the application based on the fully resolved application provisioning model produced based on the one or more first-level dependencies and the at least one other dependency.

2. The method of claim 1, wherein the automatically recursively creating further comprises:
    repeating the selecting one or more times, and based on selecting another first-level dependency, repeating the using and the determining its dependencies for each determined second-level asset dependency o1 the selected another first-level dependency.

3. The method of claim 1, further comprising customizing the application provisioning model, wherein the customizing comprises changing the application provisioning model by adding one or more new dependencies to the application provisioning model based on a final binding of one or more parameters in the application provisioning model.

4. The method of claim 1, further comprising parsing the application to automatically determine the one or more first-level dependencies.

5. The method of claim 1, wherein a dependency of the one or more first-level dependencies or of the at least one other dependency includes a parameter to be customized, and wherein the method further comprises customizing the parameter to provide a specific resource for the application.

6. The method of claim 1, wherein the one or more first-level dependencies are included in an application model automatically created by a preprocessor, in response to parsing the application, and wherein the at least one other dependency is identified using at least one asset model created for the application.

7. The method of claim 6, further comprising creating the at least one asset model, wherein an asset model created for a dependency of the application comprises a structured representation of one or more asset dependencies for that dependency.

8. The method of claim 1, wherein the automatically determining comprises parsing the application by a preprocessor executing on the first processor to automatically determine the one or more first-level dependencies.

9. The method of claim 1, wherein the first processor and the second processor are the same processor.

10. The method of claim 9, wherein the recursively identifying and the provisioning are performed by a software provisioning tool executing on the processor.

11. A computer program product for determining application dependencies, the computer program product comprising:

a non-transitory computer readable storage medium readable by a processing circuit and storing instructions for execution by the processing circuit for performing a method comprising:

automatically creating an application provisioning model to be used in provisioning an application, said automatically creating the application provisioning model comprising:

obtaining an indication of one or more first-level dependencies of the application to be provisioned, the one or more first-level dependencies automatically determined; and automatically recursively creating, based on the one or more first-level dependencies, an indication of at least one other dependency of the application at one or more other levels of dependency, wherein the one or more first-level dependencies and the at least one other dependency at one or more other levels of dependency form the application provisioning model, the application provisioning model being fully resolved, and wherein the automatically recursively creating comprises:

selecting a first-level dependency of the one or more first-level dependencies;

using an asset description of the selected first-level dependency to automatically determine for that selected first-level dependency one or more second-level asset dependencies, if any;

for each determined second-level asset dependency, determining its dependencies, if any, wherein based on determining a dependency for a determined second-level asset dependency, that dependency would be at a different level than the first-level or second-level dependencies, and repeating for the dependency at the different level, if any, the determining its dependencies; and provisioning the application based on the fully resolved application provisioning model produced based on the one or more first-level dependencies and the at least one other dependency.

12. The computer program product of claim 11, wherein the automatically recursively creating further comprises:

repeating the selecting one or more times, and based on selecting another first-level dependency, repeating the using and the determining its dependencies for each determined second-level asset dependency of the selected another first-level dependency.

13. The computer program product of claim 11, wherein a dependency of the one or more first-level dependencies or of the at least one other dependency includes a parameter to be customized, and wherein the method further comprises customizing the parameter to provide a specific resource for the application.

14. The computer program product of claim 11, wherein the method further comprises customizing the application provisioning model, wherein the customizing comprises changing the application provisioning model by adding one or more new dependencies to the application provisioning model based on a final binding of one or more parameters in the application provisioning model.

15. The computer program product of claim 11, wherein the one or more first-level dependencies are included in an application model automatically created by a preprocessor, in response to parsing the application, and wherein the at least one other dependency is identified using at least one asset model created for the application.

16. The computer program product of claim 11, wherein the obtaining comprises parsing the application by a preprocessor to automatically determine the one or more first-level dependencies.

17. A computer system for determining application dependencies, the computer system comprising:

a memory; and a processor in communications with the memory, wherein the computer system is configured to perform a method, said method comprising:

automatically creating an application provisioning model to be used in provisioning an application, said automatically creating the application provisioning model comprising:

obtaining an indication of one or more first-level dependencies of the application to be provisioned, the one or more first-level dependencies automatically determined; and automatically recursively creating, based on the one or more first-level dependencies, an indication of at least one other dependency of the application at one or more other levels of dependency, wherein the one or more first-level dependencies and the at least one other dependency at one or more other levels of dependency form the application provisioning model, the application provisioning model being fully resolved, and wherein the automatically recursively creating comprises:

selecting a first-level dependency of the one or more first-level dependencies;

using an asset description of the selected first-level dependency to automatically determine for that selected first-level dependency one or more second-level asset dependencies, if any;

for each determined second-level asset dependency, determining its dependencies, if any, wherein based on determining a dependency for a determined second-level asset dependency, that dependency would be at a different level than the first-level or second-level dependencies, and repeating for the dependency at the different level, if any, the determining its dependencies; and provisioning the application based on the fully resolved application provisioning model produced based on the one or more first-level dependencies and the at least one other dependency.

18. The computer system of claim 17, wherein the automatically recursively creating further comprises:

repeating the selecting one or more times, and based on selecting another first-level dependency, repeating the using and the determining its dependencies for each determined second-level asset dependency of the selected another first-level dependency.

19. The computer system of claim 17, wherein the method further comprises parsing the application to automatically determine the one or more first-level dependencies.

20. The computer system of claim 17, wherein a dependency of the one or more first-level dependencies or of the at least one other dependency includes a parameter to be customized, and wherein the method further comprises customizing the parameter to provide a specific resource for the application.

21. The computer system of claim 17, wherein the method further comprises customizing the application provisioning model, wherein the customizing comprises changing the application provisioning model by adding one or more new dependencies to the application provisioning model based on a final binding of one or more parameters in the application provisioning model.

22. The computer system of claim 17, wherein the one or more first-level dependencies are included in an application model automatically created by a preprocessor, in response to parsing the application, and wherein the at least one other dependency is identified using at least one asset model created for the application.

* * * * *